United States Patent
Raphael

[19]

[11] Patent Number: 5,937,795
[45] Date of Patent: Aug. 17, 1999

[54] PETS DISPOSABLE POTTY

[76] Inventor: Angela A. Raphael, 320 Manhattan Ave. #56, New York, N.Y. 10026

[21] Appl. No.: 08/974,649

[22] Filed: Nov. 19, 1997

[51] Int. Cl.[6] .................................................. A01K 23/00
[52] U.S. Cl. ........................................... 119/869; 119/868
[58] Field of Search ..................... 119/867, 868, 119/869, 850, 856, 858, 863, 907

[56] References Cited

U.S. PATENT DOCUMENTS

| | | | |
|---|---|---|---|
| 4,444,152 | 4/1984 | Berardo | 119/868 |
| 4,510,887 | 4/1985 | Lincoln et al. | 119/868 |
| 4,709,661 | 12/1987 | Mayle, Jr. | 119/868 |
| 4,969,419 | 11/1990 | Fong | 119/868 |
| 5,146,874 | 9/1992 | Vidal | 119/868 |
| 5,315,960 | 5/1994 | Lamp | 119/868 |
| 5,355,836 | 10/1994 | Vallery | 119/868 |
| 5,386,802 | 2/1995 | Hang-Fu | 119/868 |
| 5,427,059 | 6/1995 | Logan | 119/868 |
| 5,540,470 | 7/1996 | Lu | 294/1.4 |

*Primary Examiner*—Michael J. Carone
*Assistant Examiner*—James S. Bergin
*Attorney, Agent, or Firm*—Richard L. Miller, P.E.

[57] ABSTRACT

A device for attaching to a pet and capturing feces and urine therefrom that includes an adjustable collar, an adjustable harness, a feces receptacle, and a urine receptacle. The collar releasably and adjustably encircles the neck of the pet. The adjustable harness is releasably attached to the adjustable collar and replaceably engages the pet. The feces receptacle is detachably mounted to the adjustable harness and is disposed below and captures the feces from the anus of the pet. The urine receptacle is separate from the feces receptacle and is detachably mounted to the adjustable harness and is disposed in proximity of and captures urine from the genitals of the pet.

15 Claims, 2 Drawing Sheets

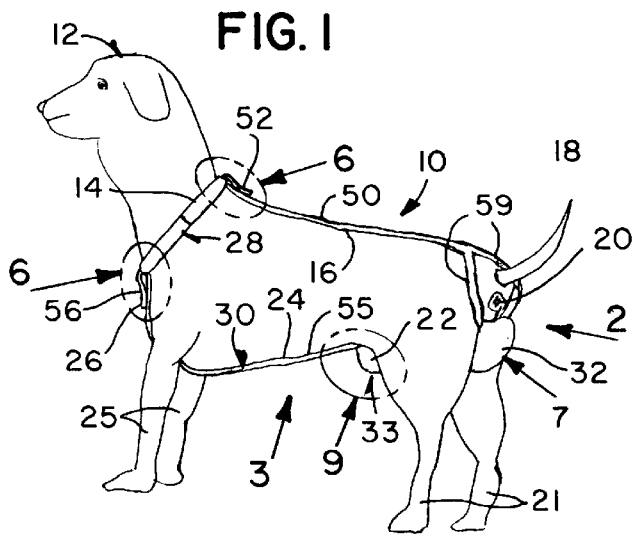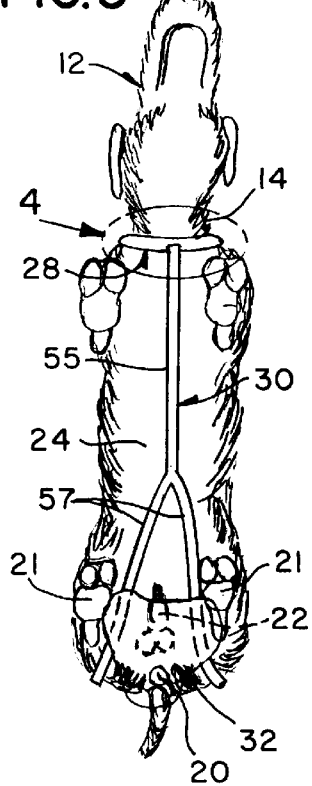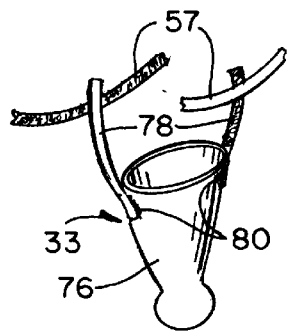

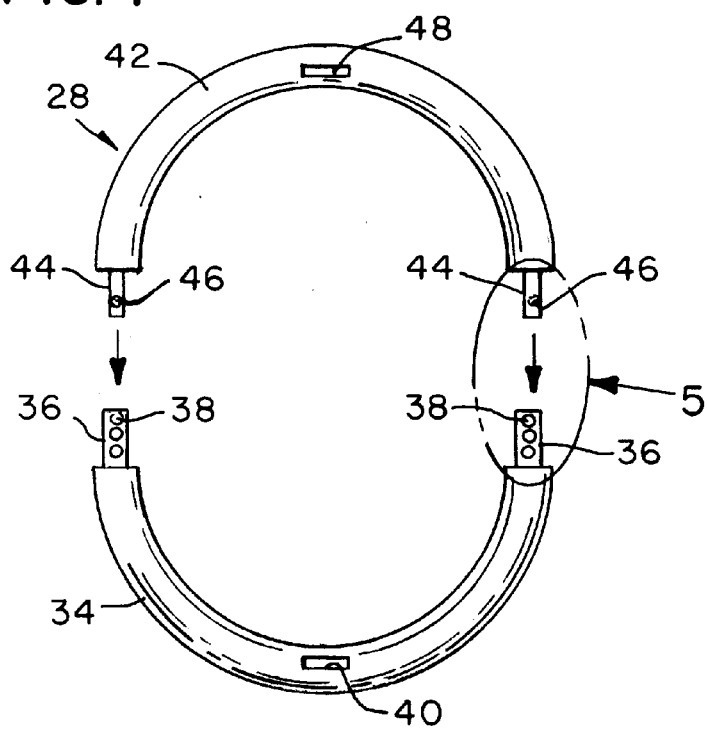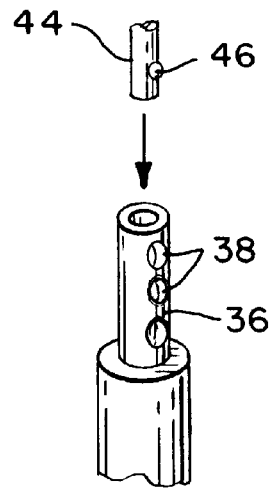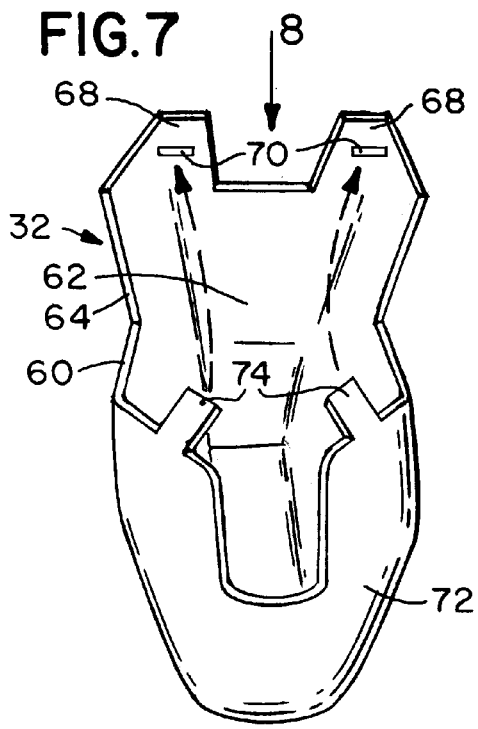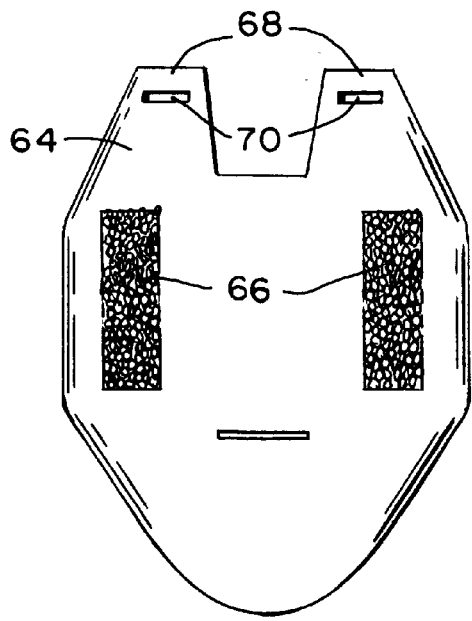

PETS DISPOSABLE POTTY

BACKGROUND OF THE INVENTION

1. Field of the Invention

The present invention relates to a potty. More particularly, the present invention relates to a pets disposable potty.

2. Description of the Prior Art:

Numerous innovations for animal waste collection devices have been provided in the prior art that will be described. Even though these innovations may be suitable for the specific individual purposes to which they address, however, they differ from the present invention.

FOR EXAMPLE, U.S. Pat. No. 4,444,152 to Berardo teaches a device for collecting animal wastes comprising a harness adapted for attachment to the hind quarters of the animal and a collection bag detachably connected to the harness. The fasteners connecting the bag to the harness are of a type permitting the use of any flexible bag and in particular permit the use of inexpensive disposable plastic garbage bags. The preferred form of fastener for securing the bag comprises the loop and stud type fastener commonly used for hosiery garters.

ANOTHER EXAMPLE, U.S. Pat. No. 4,709,661 to Mayle, Jr. teaches a waste bag for collecting solid waste excretions of a horse that includes a bottom cup-like portion and a back portion extending upwardly from the rearward side of the bottom portion. Edges of the back portion are resiliently reinforced so that the back portion conforms to the horses's hips and permits excreted waste to be directed into the bottom portion. A zipper in the bottom portion permits the bag to be selectively emptied without removing the bag from the horse. Drainage holes in the bottom portion automatically drain liquid therefrom. The bag is secured in place by adjustable straps extending from the bag to engage a waistband on the horse.

STILL ANOTHER EXAMPLE, U.S. Pat. No. 4,969,419 to Fong teaches an appliance for collecting animal excrement in which a harness is fitted on the trunk of a dog for holding a collector in a position transversely across the rear of the dog below the base of the tail and the anal opening. The harness has an extension extending along the tail and terminating in a top fastener spaced outwardly from the base of the tail. The collector has a top opening with a pair of tab elements adapted to be connected together and engaged with the top fastener on the top surface of the tail. The harness has side members with side fasteners at opposite sides of the dog which are used to position the collector snugly against the rear of the dog below the anal opening. The top opening of the collector is closed when the tail is lowered and is opened when the tail is raised to a normal defecating position. The harness has loops adapted to encircle the four legs of the dog and a ring providing a site for attaching a leash to the harness. The fasteners comprise spring clips mounted for adjustment to properly position the collector. The collector comprises a tubular envelope having at the bottom, end a straight bottom transverse seam, and at the top end a transverse first cut extending only partially across the tubular envelope and a second cut extending across the full width of the envelope above the partial cut in a straight line parallel to the bottom seam to form the tab elements.

YET ANOTHER EXAMPLE, U.S. Pat. No. 5,355,836 to Vallery teaches a dog-feces collection system that includes a harness and a bag. The harness is attached to a dog adjacent to his rear-end. The bag has an open end, a first side edge and a second side edge and is detachably coupled to the harness. The harness holds open the bag in order to collect feces from the dog.

FINALLY, STILL YET ANOTHER EXAMPLE, U.S. Pat. No. 5,540,470 to Lu teaches a collecting device used to collect refuse as animal droppings or any matter thrown on the ground in a sanitary and convenient manner that allows the collector to keeps hands clean. The collecting device comprises an elongated handle, a paddle mount for mounting a slidable paddle, a featured bag holding mechanism for holding a bag used to contain collected refuse or objects, a paddle controlling mechanism for controlling the paddle to scoop refuse or objects on the ground. The collecting device can be operated effortlessly even by single hand to collect any refuse such as animal feces, trash, or any other matter off the ground no matter whether the ground is flat or not.

It is apparent that numerous innovations for animal waste collection devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a pets disposable potty that avoids the disadvantages of the prior art.

ANOTHER OBJECT of the present invention is to provide a pets disposable potty that is simple and inexpensive to manufacture.

STILL ANOTHER OBJECT of the present invention is to provide a pets disposable potty that is simple to use.

BRIEFLY STATED, YET ANOTHER OBJECT of the present invention is to provide a device for attaching to a pet and capturing feces and urine therefrom that includes an adjustable collar, a harness, a feces receptacle, and a urine receptacle. The collar releasably and adjustably encircles the neck of the pet. The harness is releasably attached to the adjustable collar and replaceably engages the pet. The feces receptacle is detachably mounted to the harness and is disposed below and captures the feces from the anus of the pet. The urine receptacle is separate from the feces receptacle and is detachably mounted to the harness and is disposed in proximity of and captures urine from the genitals of the pet.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of a pet wearing the present invention;

FIG. 2 is an enlarged diagrammatic rear elevational view taken generally in the direction of arrow 2 in FIG. 1;

FIG. 3 is a diagrammatic bottom plan view taken generally in the direction of arrow 3 in FIGS. 1 and 2;

FIG. 4 is an enlarged exploded diagrammatic front elevational view of the area generally enclosed by the dotted ellipse identified by arrow 4 in FIG. 3;

FIG. 5 is an enlarged exploded diagrammatic perspective view of the area generally enclosed by the dotted ellipse identified by arrow 5 in FIG. 4;

FIG. 6 is an enlarged diagrammatic perspective view of the area generally enclosed by the dotted ellipse identified by arrow 6 in FIG. 1;

FIG. 7 is an enlarged diagrammatic perspective view of the area generally enclosed by the dotted ellipse identified by arrow 7 in FIG. 1;

FIG. 8 is a diagrammatic rear elevational view taken generally in the direction of arrow 8 in FIG. 7; and FIG. 9 is an enlarged diagrammatic perspective view of the area generally enclosed by the dotted ellipse identified by arrow 9 in FIG. 1.

LIST OF REFERENCE NUMERALS UTILIZED IN THE DRAWING

| | |
|---|---|
| 10 | pets disposable potty of the present invention |
| 12 | pet |
| 14 | neck of pet 12 |
| 16 | back of pet 12 |
| 18 | tail of pet 12 |
| 20 | anus of pet 12 |
| 21 | hind legs of pet 12 |
| 22 | genitals of pet 12 |
| 24 | belly of pet 12 |
| 25 | front legs of pet 12 |
| 26 | breast of pet 12 |
| 28 | adjustable collar |
| 30 | adjustable harness |
| 32 | feces receptacle |
| 33 | urine receptacle |
| 34 | lower half of adjustable collar 28 |
| 36 | pair of reduced portions of lower half 34 of adjustable collar 28 |
| 38 | plurality of throughbores in each reduced portion of pair of reduced portions 36 of lower half 34 of adjustable collar 28 |
| 40 | throughslot in lower half 34 of adjustable collar 28 |
| 42 | upper half of adjustable collar 28 |
| 44 | pair of reduced portions of upper half 42 of adjustable collar 28 |
| 46 | sphere on each reduced portion of pair of reduced portions 44 of upper half 42 of adjustable collar 28 |
| 48 | throughslot in upper half 42 of adjustable collar 28 |
| 50 | upper strap of adjustable harness 30 |
| 52 | free end of upper strap 50 of adjustable harness 30 |
| 54 | hook and loop fasteners |
| 55 | lower strap of adjustable harness 30 |
| 56 | free end of lower strap 55 of adjustable harness 30 |
| 57 | converging portions of adjustable harness 30 |
| 58 | hook and loop fasteners |
| 59 | pair of diverging portions of adjustable harness 30 |
| 60 | bag of feces receptacle 32 |
| 62 | closable open top of bag 60 of feces receptacle 32 |
| 64 | back wall of feces receptacle 32 |
| 66 | hook and loop fasteners |
| 68 | pair of tabs on back wall 64 of feces receptacle 32 |
| 70 | horizontal slots in pair of tabs 68 on back wall 64 of feces receptacle 32 |
| 72 | front wall of feces receptacle 32 |
| 74 | pair of tabs on front wall 72 of feces receptacle 32 |
| 76 | bag of urine receptacle 33 |
| 78 | straps |
| 80 | hook and loop fasteners |

DETAILED DESCRIPTION OF THE PREFERRED EMBODIMENT

Referring now to the figures in which like numerals indicate like parts, and particularly to FIG. 1, the pets disposable potty of the present invention is shown generally at 10 replaceably attached to a pet 12 having a neck 14, a back 16, a tail 18, an anus 20, hind legs 21, genitals 22, a belly 24, front legs 25, and a breast 26.

The general configuration of the pets disposable potty 10 can best be seen in FIGS. 1–3, and as such will be discussed with reference thereto.

The pets disposable potty 10 comprises an adjustable collar 28 for releasably and adjustably encircling the neck 14 of the pet 12, an adjustable harness 30 that is releasably attached to the adjustable collar 28 for replaceably engaging the pet 12, a feces receptacle 32 that is detachably mounted to the adjustable harness 30 for being disposed below and capturing feces from the anus 20 of the pet 12, and a urine receptacle 33 that is separate from the feces receptacle 32 and detachably mounted to the adjustable harness 30 for being disposed in proximity of and capturing urine from the genitals 22 of the pet 12.

The configuration of the adjustable collar 28 can best be seen in FIGS. 4 and 5, and as such will be discussed with reference thereto.

The adjustable collar 28 comprises a semi-circular lower half 34 that is tubular and concavo-convex-shaped and terminates in a pair of reduced portions 36 that are tubular and hollow, with each of which having a plurality of bores 38 therein that are longitudinally spaced-apart and extend laterally through one side thereof. The lower half 34 of the adjustable collar 28 further has a throughslot 40 therein that extends forwardly through a lowermost point thereof.

The adjustable collar 28 further comprises a semi-circular upper half 42 that is tubular and convexo-concave-shaped and terminates in a pair of reduced portions 44 that are tubular and rigid, with each of which having a sphere 46 that extends laterally outward from one side thereof, and with each of which being detachably received in a respective reduced portion of the pair of reduced portions 36 of the lower half 34 of the adjustable collar 28 and being selectively maintained therein by the sphere 46 releasably engaging in a respective bore 38 so as to allow for different sized necks 14 of the pets 12. The upper half 42 of the adjustable collar 28 further has a throughslot 48 therein that extends forwardly through a highest point thereof.

It is to be understood that the sphere 46 can be integrally molded with the upper half 42 of the adjustable collar 28 and rely on compression to maintain it in the bore 38, or in the alternative, can be spring biased to maintain it in the bore 38.

The configuration of the adjustable harness 30 can best be seen in FIGS. 1–3 and 6, and as such will be discussed with reference thereto.

The adjustable harness 30 comprises an upper strap 50 that is slender and elongated and has a free end 52 that passes through the throughslot 48 in and around the upper half 42 of the adjustable collar 28 and doubles back onto itself where it is adjustably and releasably maintained thereat by hook and loop fasteners 54 so as to allow for different sized pets 12.

The upper strap 50 of the adjustable harness 30 extends rearwardly from the upper half 42 of the adjustable collar 28, longitudinally along the back 16 of the pet 12, to before the tail 18 of the pet 12, where it branches out into a pair of diverging portions 59 that straddle the tail 18 of the pet 12 and the anus 20 of the pet 12.

The pair of diverging portions 59 of the adjustable harness 30 converge into converging portions 57 that straddle and meet in front of the genitals 22 of the pet 12, and extend into a lower strap 55 that is slender and elongated and extends longitudinally forwardly along the belly 24 of the pet 12 and upwardly along the breast 26 of the pet 12 between the front legs 25 of the pet 12 and terminates in a free end 56 that passes through the throughslot 40 in and around the lower half 34 of the adjustable collar 28 and doubles back onto itself where it is adjustably and releasably maintained thereat by hook and loop fasteners 58 so as to allow for different sized pets 12.

The configuration of the feces receptacle 32 can best be seen in FIGS. 2, 3, 7, and 8, and as such will be discussed with reference thereto.

The feces receptacle 32 comprises a bag 60 that is sized to fit comfortably between the hind legs 21 of the pet 12 and has a closable open top 62 for positioning below the anus 20 of the pet 12 and receiving the feces therefrom, a back wall 64 that is detachably mounted to the converging portions 57 of the adjustable harness 30 by hook and loop fasteners 66 and has a pair of tabs 68 that extend from its uppermost edge with horizontal slots 70 therethrough, a front wall 72 that opposes the back wall 64 of the bag 60 of the feces receptacle 32 and has a pair of tabs 74 that extend from its uppermost edge that selectively enter the horizontal slots 70 in the pair of tabs 68 of the back wall 64 of the bag 60 of the feces receptacle 32 and close the open top 62 of the bag 60 of the feces receptacle 32 when the feces receptacle 32 is to be discarded so as to assure the feces does not leak therefrom.

The configuration of the urine receptacle 33 can best be seen in FIGS. 1 and 9, and as such will be discussed with reference thereto.

The urine receptacle 33 comprises a bag 76 that is shaped like a condom and receives the genitals 22 of the pet 12 when the pet 12 is a male, or in the alternative, is disposed below the genitals 22 of the pet 12 when the pet 12 is a female.

The bag 76 of the urine receptacle 33 is detachably suspended from the converging portions 57 of the adjustable harness 30, in front of the feces receptacle 32, by straps 78 that are detachably mounted to the bag 76 of the urine receptacle 33 by hook and loop fasteners 80 so as to allow for pets with different sized genitals 22.

It will be understood that each of the elements described above, or two or more together, may also find a useful application in other types of constructions differing from the types described above.

While the invention has been illustrated and described as embodied in a pets disposable potty, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for attaching to a pet and capturing feces and urine therefrom, comprising:
   a) an adjustable collar for releasably and adjustably encircling the neck of the pet; said adjustable collar comprising a semi-circular lower half being tubular and concavo-convex-shaped and terminating in a pair of reduced portions being tubular and hollow, with each of which having a plurality of bores therein being longitudinally spaced-apart and extending laterally through one side thereof;
   b) an adjustable harness releasably attached to said adjustable collar for replaceably engaging the pet; and
   c) a feces receptacle detachably mounted to said adjustable harness for being disposed below and capturing the feces from the anus of the pet.

2. The device as defined in claim 1, wherein said lower half of said adjustable collar further has a throughslot therein that extends forwardly through a lowermost point thereof.

3. The device as defined in claim 2, wherein said adjustable collar further comprises a semi-circular upper half that is tubular and convexo-concave-shaped and terminates in a pair of reduced portions that are tubular and rigid, with each of which having a sphere that extends laterally outward from one side thereof, and with each of which being detachably received in a respective reduced portion of said pair of reduced portions of said lower half of said adjustable collar and being selectively maintained therein by said sphere releasably engaging in a respective bore so as to allow for different sized necks of the pets.

4. The device as defined in claim 3, wherein said upper half of said adjustable collar further has a throughslot therein that extends forwardly through a highest point thereof.

5. The device as defined in claim 4, wherein said adjustable harness comprises an upper strap that is slender and elongated and has a free end that passes through said throughslot in, and around, said upper half of said adjustable collar and doubles back onto itself where it is adjustably and releasably maintained thereat by hook and loop fasteners so as to allow for different sized pets.

6. The device as defined in claim 5, wherein said upper strap of said adjustable harness extends rearwardly from said upper half of said adjustable collar, longitudinally along the back of the pet, to before the tail of the pet, where it branches out into a pair of diverging portions that straddle the tail of the pet and the anus of the pet.

7. The device as defined in claim 6, wherein said pair of diverging portions of said adjustable harness converge into converging portions that straddle, and meet in front of, the genitals of the pet, and extend into a lower strap that is slender and elongated and which extends longitudinally forwardly along the belly of the pet and upwardly along the breast of the pet between the front legs of the pet and terminates in a free end that passes through said throughslot in, and around, said lower half of said adjustable collar and doubles back onto itself where it is adjustably and releasably maintained thereat by hook and loop fasteners so as to allow for different sized pets.

8. The device as defined in claim 7, wherein said feces receptacle comprises a bag that is sized to fit comfortably between the hind legs of the pet and has a closable open top for positioning below the anus of the pet and receiving feces therefrom.

9. The device as defined in claim 8, wherein said bag of said feces receptacle further has a back wall that is detachably mounted to said converging portions of said adjustable harness by hook and loop fasteners.

10. The device as defined in claim 9, wherein said back wall of said bag of said feces receptacle has a pair of tabs that extend from its uppermost edge with horizontal slots therethrough.

11. The device as defined in claim 10, wherein said bag of said feces receptacle further has a front wall that opposes said back wall of said bag of said feces receptacle and has a pair of tabs that extend from its uppermost edge that selectively enter said horizontal slots in said pair of tabs on said back wall of said bag of said feces receptacle and close said open top of said bag of said feces receptacle when said feces receptacle is to be discarded so as to assure that the feces does not leak therefrom.

12. The device as defined in claim 7; further comprising a urine receptacle being separate from said feces receptacle and detachably mounted to said adjustable harness and for being disposed in proximity of, and capturing urine from, the genitals of the pet.

13. The device as defined in claim 12, wherein said urine receptacle comprises a bag that is shaped like a condom and either receives the genitals of the pet when the pet is a male or is disposed below the genitals of the pet when the pet is a female.

14. The device as defined in claim 13, wherein said bag of said urine receptacle is detachably suspended from said converging portions of said adjustable harness, in front of said feces receptacle, by straps that are detachably mounted to said bag of said urine receptacle by hook and loop fasteners so as to allow for different sized genitals of the pets.

15. The device as defined in claim 3, wherein said sphere is integrally molded with said upper half of said adjustable collar and either relies on compression to maintain it in said bore or is spring biased to maintain it in said bore.

* * * * *